United States Patent [19]
Hicks, Jr.

[11] Patent Number: 4,551,162

[45] Date of Patent: Nov. 5, 1985

[54] HOLLOW TUBE METHOD FOR FORMING AN OPTICAL FIBER

[75] Inventor: John W. Hicks, Jr., Northboro, Mass.

[73] Assignee: Polaroid Corporation, Cambridge, Mass.

[21] Appl. No.: 656,260

[22] Filed: Oct. 1, 1984

[51] Int. Cl.⁴ ............................................. C03B 37/14
[52] U.S. Cl. ........................................ 65/4.2; 65/4.21; 65/13; 350/96.33
[58] Field of Search ............... 65/2, 3.11, 3.12, 13, 65/4.2, 4.21; 350/96.33

[56] References Cited

U.S. PATENT DOCUMENTS

| | | | |
|---|---|---|---|
| Re. 28,664 | 12/1975 | Miller | 350/96 |
| 3,190,735 | 6/1965 | Kapany | 65/4.2 |
| 3,269,817 | 8/1966 | Bondley | 65/4.21 |
| 3,535,017 | 10/1970 | Miller | 350/96 |
| 3,844,752 | 10/1974 | Kaiser | 65/4.2 |
| 4,046,537 | 9/1977 | Deserno et al. | 65/2 |
| 4,123,483 | 10/1978 | Nakahara et al. | 264/1 |
| 4,127,398 | 11/1978 | Singer | 65/13 X |
| 4,395,270 | 7/1983 | Blankenship et al. | 65/3.12 |

FOREIGN PATENT DOCUMENTS 47-46010  11/1972  Japan ........................... 65/4.2

Primary Examiner—Robert Lindsay
Attorney, Agent, or Firm—David R. Thornton

[57] ABSTRACT

A method for forming an optical fiber from a single characteristic glass includes arraying hollow starter tubes about a central axis with each starter tube contacting its adjoining tubes along respective lines of contact to define a longitudinally extending opening about the central axis. The arrayed starter tubes are heated to cause them to fuse together along their lines of contact, and the fused starter tubes are inserted into a jacketing tube, preferably having the same physical and optical properties as the starter tubes. A pressure differential is established between the interior of the starter tubes and the tube-defined longitudinally extending opening. The tube assembly is heated to allow the established pressure differential to cause portions of the starter tubes to reform by moving toward and to the central axis to create a solid, void-free core and supporting webs. Other portions of the starter tubes expand toward and fuse to the interior surface of the jacketing tube. The resulting optical fiber has a central core supported from the interior of jacketing tube by the starter tube-defined webs with all the structural features of the fiber formed from a glass having the same physical and optical properties.

11 Claims, 7 Drawing Figures

FIG. 1
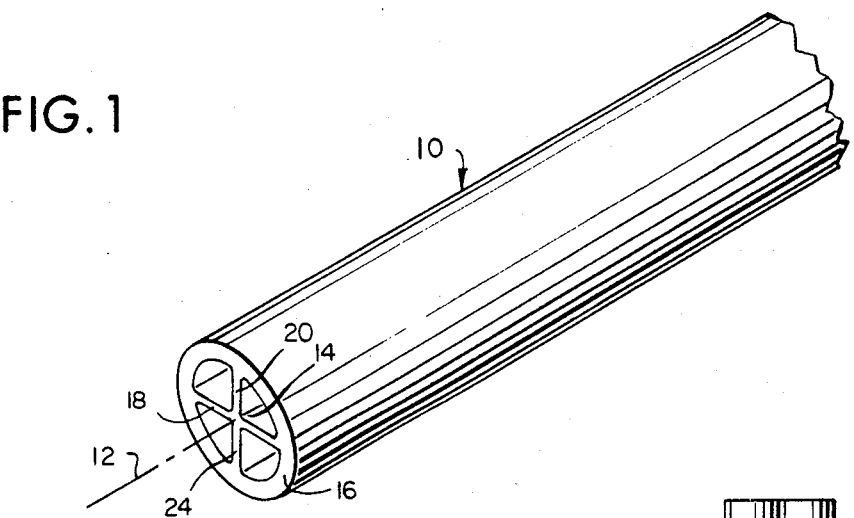
FIG. 3
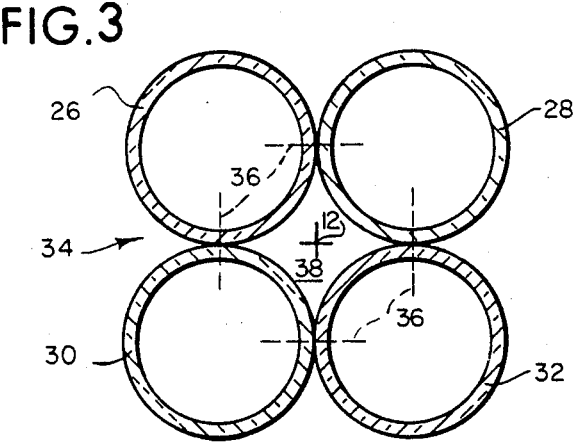
FIG. 4
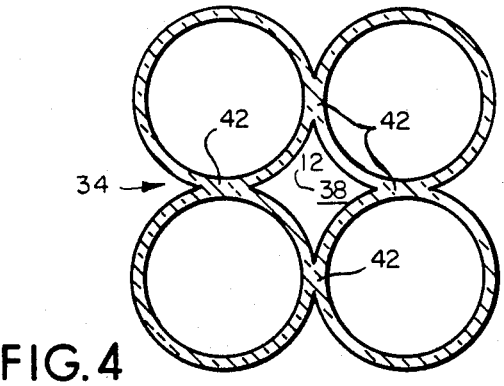
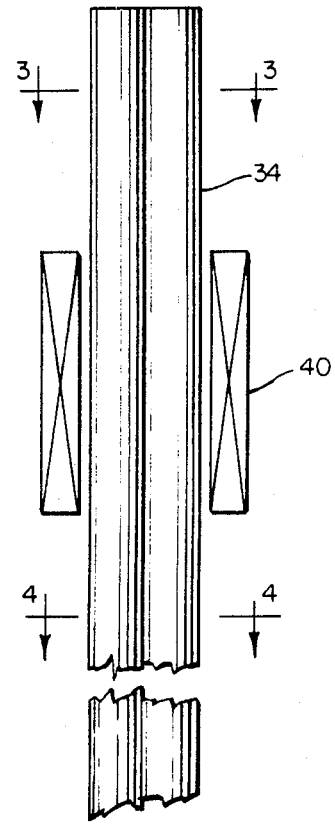
FIG. 2

HOLLOW TUBE METHOD FOR FORMING AN OPTICAL FIBER

BACKGROUND OF THE INVENTION

1. Field of the Invention

This invention relates to optical fibers. More particularly, it relates to a method for forming optical fibers and the optical fiber formed thereby.

2. Prior Art

Optical fibers typically include an optical energy transmitting core having a selected index of refraction surrounded by a cladding having an index of refraction less than that of the core to enable guided optical energy transmission through the core from an input port to an output port. There are several common methods for manufacturing optical fibers. The most common method uses a glass starting cylinder or rod, typically high-purity fused silica or doped fused silica, that is coated on its exterior surface with a layer or deposit of a glass or doped glass. The exterior layer can be formed by applying minute soot-like glass or doped glass particles to the rod by well known chemical vapor deposition techniques. The soot-like glass coating is sintered during this application, and the composite structure is then heated to its drawing temperature and drawn down in one or more drawing stages to form the resulting optical fiber with the starting rod defining the resulting core and the deposited coating defining the cladding layer. A variation of this method of forming optical fibers involves coating the interior surface of a hollow glass tube, typically high-purity fused silica or doped fused silica, with a layer or deposit of a glass or doped glass. The interior coating can be applied in the manner described above, that is, by applying a deposit of minute soot-like particles by the chemical vapor deposition technique. After the internal coating is applied, the composite structure is heated to sinter the coating and the hollow tube is drawn down to collapse the tube to form a solid, void-free core. The internal coating defines the optical energy transmitting core and is designed with an index of refraction greater than that of the cladding defined by the hollow starting tube.

While the methods described above are well suited for formal optical fibers, great care is required during the chemical vapor deposition stage to deposit coatings having the proper dopant concentrations to provide a resulting glass having the desired index of refraction and optical transmission qualities. The chemical vapor deposition process can be time-consuming, can require considerable expertise, and is vulnerable to contamination.

Efforts have been made in the direction of optical fibers having an air cladding and optical fibers formed from single-glasses, that is, an optical fiber in which the core and cladding are formed from the same glass and yet has a core with an index of refraction relatively higher than that of the cladding. Typically, such optical fibers have been formed by designing core/cladding structures that place the core under a stress relative the cladding to cause a stress-induced birefringence or stress-induced increase in the index of refraction. One such optical fiber structure is disclosed in U.S. Pat. No. Re 28,664 to S. E. Miller. As disclosed therein, a circularly symmetric optical energy transmitting core is supported on two sides within a hollow, cylindrical support tube or jacket so that the core is at least partially surrounded by an air cladding. The equivalent of a central core portion is supported from the outer tube by thin diametrically extending web-like formations.

While such optical fibers utilizing a single material, or a material having a uniform index of refraction throughout in reliance on the lower index of refraction of air in relation to glass, demonstrate potential advantages over conventional core/cladding fibers, the resulting fiber structure is very fragile. Accordingly, the likelihood of damage from normal handling and use in an optical communication system is high.

SUMMARY OF THE INVENTION

The present invention provides a method for manufacturing an optical fiber from a single material in which the resulting fiber has good optical energy transmitting characteristics and will withstand normal handling with little likelihood of diminished optical performance or physical damage. More specifically, a plurality of elongated hollow starter tubes are arranged parallel to a core axis with each tube contacting its adjoining tubes along a line of contact to define a central opening or cavity along the core axis. The starter tubes are thermally treated to cause them to fuse together along contact patches. The fused starter tube array is then inserted into a hollow jacketing tube and a pressure differential established between the interior of the starter tubes and the tube-defined central opening while the assembled tubes are heated to a temperature above their softening point to cause those portions of the starter tube walls that define the boundary of the central opening to collapse toward and to the core axis to form a solid, void-free optical energy transmitting core. Remaining portions of the starter tubes expand toward and into contact with the interior of the jacketing tube and toward and into wall portions of an adjoining starter tube to form webs that support the core relative to the jacket. The resulting optical fiber structure is then heated to a temperature above its drawing temperature and drawn down in one or more drawing stages to form the final optical fiber.

The optical fiber produced by the method of the present invention has an optical energy transmitting core supported within the jacketing tube by orthogonal webs to provide a circularly symmetric optical fiber having good optical energy transmitting qualities and which is less susceptible to performance degradations or physical damage from normal handling.

A principal objective of the present invention is, therefore, the provision of an improved method for forming an optical fiber from a single-component material and a resulting optical fiber having good optical transmission characteristics and handling characteristics. Other objects and further scope of applicability of the present invention will become apparent from the detailed description to follow, taken in conjunction with the accompanying drawings, in which like parts are designated by like reference characters.

BRIEF DESCRIPTION OF THE DRAWINGS

FIG. 1 is an isometric view of an end portion of an optical fiber formed in accordance with the method of the present invention;

FIG. 2 is a side elevational view of an array of starter tubes being passed through a heating furnace to cause the starter tubes to fuse together along lines of contact;

FIG. 3 is a cross sectional view, taken along line 3—3 of FIG. 2, showing the array of starter tubes contacting one another along lines of contact prior to entering the heating furnace;

FIG. 4 is a cross sectional view, taken along line 4—4 of FIG. 2, showing the array of starter tubes after exiting the heating furnace and fused to one another along contact patches or zones;

DESCRIPTION OF THE PREFERRED EMBODIMENT

Figure 5:
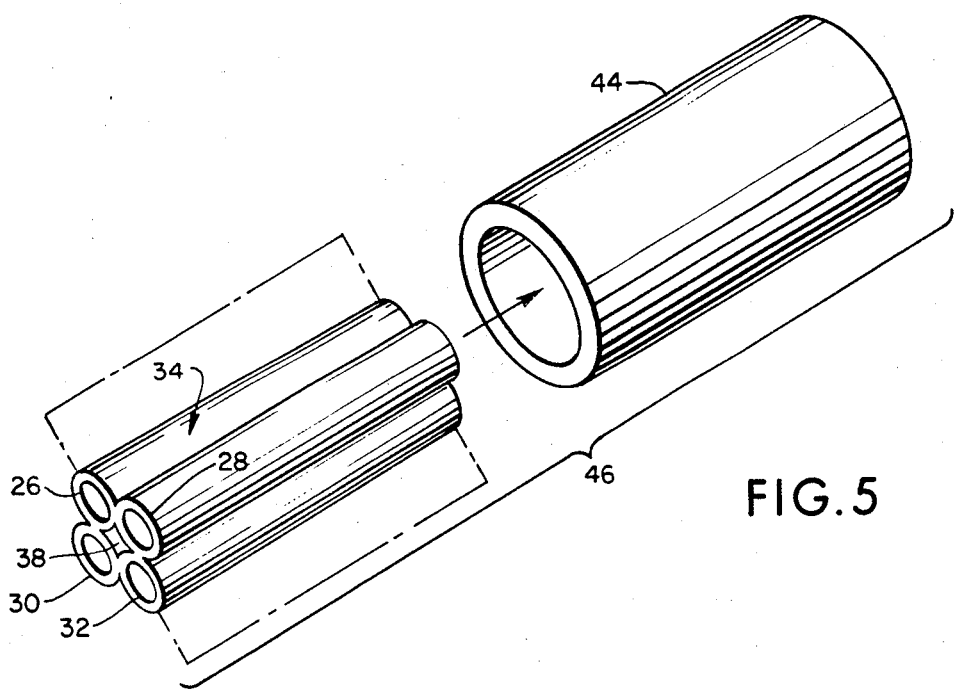
FIG. 5 is an exploded isometric view of a fused starter tube array of FIG. 4 positioned for insertion into the interior of a jacketing tube.

The process of the present invention can be used to manufacture optical fibers of the type illustrated in FIG. 1 and designated generally therein by the reference character 10. The optical fiber 10 of FIG. 1, the manufacturing steps of which are described in detail below, is aligned along an axis 12 and includes a core 14 formed along the axis, a sheath or jacket 16, and diametrically aligned webs 18, 20, 22, and 24 which support the core relative to the jacket and define sector-shaped openings between the core and the jacket. The sector-shaped openings contain air which serves as a cladding layer to facilitate guided light transmission in the core 14. In accordance with one feature of the invention, the glass that forms the core 12, the jacket 16, and the webs 18, 20, 22, and 24 preferably has the same physical and optical characteristics and, if desired, can be obtained from the same melt to avoid those problems that arise in manufacturing optical fibers from glasses with differing physical or optical characteristics. The index of refraction of the starting glass, of course, should be greater than that of air so that the air cladding will be effective to cause guided light transmission in the core 14.

The optical fiber 10 is fabricated, as shown in FIG. 3, by first aligning four elongated hollow starter tubes 26, 28, 30, and 32 into a rectangular 2×2 starter tube array 34 formed about the axis 12. As shown in FIG. 3, each starter tube is in contact with adjoining starter tubes along respective lines of contact indicated generally by the dashed lines 36. Those wall surface portions of the starter tubes 26, 28, 30, and 32 that face the axis 12 define a central cavity or opening 38 that extends along the length of the tubes and has, in the array of FIG. 3, a astroid cross section. As shown in FIG. 2, the starter tube array 34 is passed through a heat source, such as an electric furnace 40, which heats the starter tubes 26, 28, 30, and 32 to a temperature sufficient to cause the tubes to fuse or "tack" together along their respective lines of contact 36 to form, as shown in FIG. 4, connection zones generally illustrated by the reference character 42. The fusing of the starter tube array 34 can be accomplished solely by application of heat or, if desired, by application of heat and an applied clamping force to assist in effecting the fused connections. In general, fusing should be accomplished under conditions that do not cause any significant physical distortion of the individual starter tubes 26, 28, 30, and 32 or the configuration of the overall array 34.

After the starter tube fusing is accomplished, the fused starter tube array 34 is, as shown in FIG. 5, is inserted into a jacketing tube 44 to define a preform assembly 46. As mentioned above, the jacketing tube 44 can be fabricated from a glass having the same physical and optical qualities as the starter tubes 26, 28, 30, and 32. The inside diameter of the jacketing tube 44 is selected so that the fused starter tube assembly 34 fits within the jacketing tube with a wall portion of each starter tube in contact with the interior of the jacketing tube 44.

Figure 6:
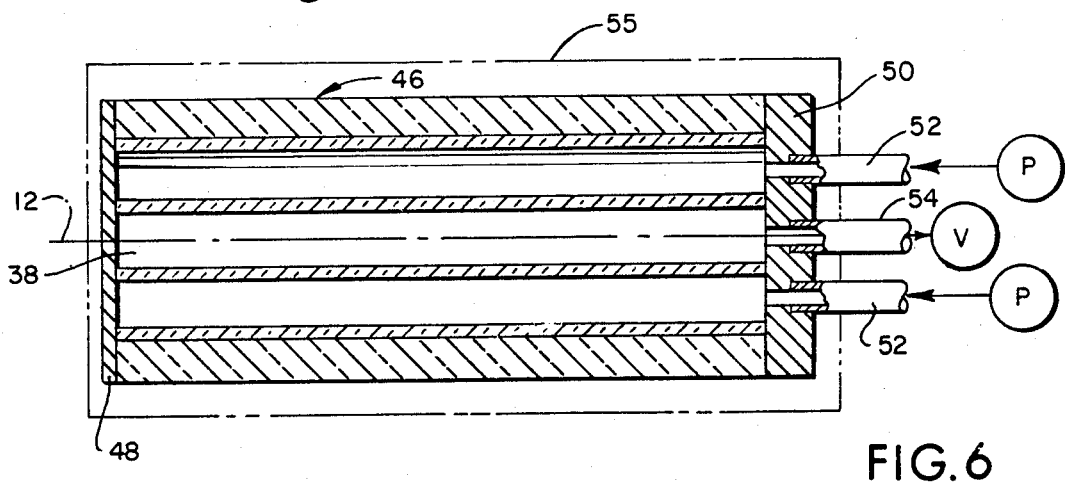
FIG. 6 is a cross sectional view of the assembled fused starter tube array and jacketing tube of FIG. 5 taken along the plane shown in broken line illustration in FIG. 5.

After the starter tube array 34 is inserted into the jacketing tube 44, the resulting preform assembly 46 is sealed, as shown in FIG. 6, by closing one end of the preform assembly with a sealing plate 48 and closing the other end with a manifold plate 50 that includes a pressurized gas entry port 52 for each of the starter tubes 26, 28, 30, and 32 and a vacuum port 54 for the central cavity 38. If desired, a sealing compound or cement (not shown) may be used to assist in providing a gas-tight seal between the ends of the preform assembly 46 and the sealing plate 48 and the manifold plate 50. The pressurized gas entry ports 52 are connected to a source of pressurized gas and the vacuum port 54 is connected to a vacuum pump so that the interior of each of the starter tubes 26, 28, 30, and 32 can be pressurized and the central cavity 38 placed under a vacuum to establish a pressure differential between the interior of the starter tubes and the central cavity defined by the starter tubes. The gas selected for pressurizing the interior of the starter tubes 26, 28, 30, and 32 should be free of contamination and non-reactive with the selected glass.

Figure 7:
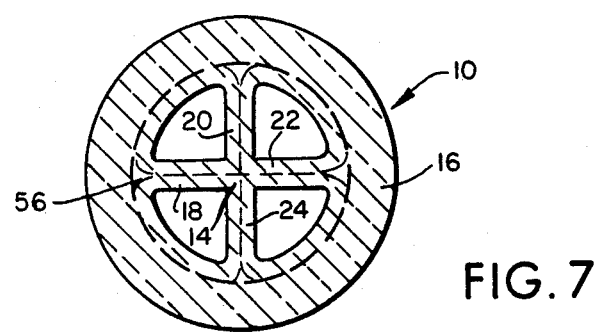
FIG. 7 is a transverse cross sectional view of the fused starter tube and jacketing tube assembly after the starter tubes have been expanded to form a solid core supported by orthogonal support webs.

With the pressure differential established within the preform assembly 46 as described above, the preform assembly 46 is plasticized by heating in a furnace represented schematically in FIG. 6 by a dashed line 55 to a temperature above its softening point. As the glass attains its softening temperature, the pressure differential is effective to cause those wall portions of the starter tubes 26, 28, 30, and 32 that face the axis 12 and define the central cavity 38 to move toward and into one another to form, as shown in FIG. 7, the solid, void-free core 14 along the axis 12 and the generally orthogonal webs 18, 20, 22, and 24. In addition, those wall surface portions of the starter tubes 26, 28, 30, and 32 that face the interior of the jacketing tube 44 expand toward and to the interior surface of the jacketing tube. In establishing the temperature and pressure differential conditions, it is desirable that the starter tube and jacketing tube surfaces readily fuse with one another to form an integral structure. Also, the application of an adequate vacuum in the above-described procedures is important to avoid entrained air pockets in the core 14 that can cause undesired light scattering. In practice, it has been found that relatively small web-end voids, such as the voids 56 shown in FIG. 7, can remain at the radially outward portions of the webs where the expanding wall surfaces of the starter tubes fail to join completely with one another and the interior surface of the jacketing tube 44. The voids 56 can be removed by establishing a pressure differential around them, for example, by pressurizing the interior of the starter tubes and placing the web-end voids under a vacuum and preferably during a reheating of the structure described above to achieve a further expansion of the glass sufficient to eliminate the voids.

After the reforming of the structure of the preform assembly 46 takes place, the resulting preform can be heated to a temperature above its drawing temperature and drawn down in one or more drawing stages to form the optical fiber 10 illustrated in FIG. 1.

The process described above can be varied; for example, the fusing of the starter tubes 26, 28, 30, and 32 can be accomplished while the starter tubes are assembled in the jacketing tube 44. Also, the heating of the assembled tubes can be accomplished by heating sections of the tubes in a continuous manner by passing the assembled tubes through a heating furnace, as shown in FIG. 2, or by heating the entire assembled tube structure simultaneously. In specifying the physical dimensions of the various tubes, particularly the starter tubes, the wall thickness should be chosen so that the resulting webs, which are formed from two adjoining starter tube wall sections, will not be unduly thick. The wall thickness of the jacketing tube is preferably thicker than that of the starter tubes to form a rugged jacket so that the overall fiber will have good handling characteristics.

In the process described above, the starter tubes have been illustrated as circularly symmetric. As can be appreciated, starter tubes and jacketing tubes having other cross-sectional shapes are suitable, provided the tube walls reform during the above-described process steps to form the web supported core.

Many different forms may be achieved by the above-noted process. The number of starter tubes can be varied, for example, two tubes may be employed in a cylindrical jacket or in an elliptical jacket with a vacuum drawn on both sides of the common tube line. Two cylindrical tubes within an elliptical jacket will provide a web extending across the short diameter of the ellipse, whereas two elliptical tubes can provide a longitudinal web. Likewise, four elliptical tubes within an elliptical jacket can provide a short on long span, all enhancing polarization characteristics. Additionally, the stress applied to the webs can be varied, for example, by providing a difference in thermal expansion between the starting tubes and jacket.

Optical fibers manufactured in accordance with the above-described process have demonstrated good light transmission efficiencies, good handling characteristics when compared to fibers manufactured by other techniques, and can be fabricated in a relatively straightforward manner.

Thus, it will be appreciated from the above that as a result of the present invention, a highly effective method for forming an optical fiber and the resulting optical fiber is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A method for forming an optical fiber comprising the steps of:
    aligning a plurality of hollow elongated starter tubes of optical fiber glass about an axis with each tube engaging adjoining tubes along respective lines of contact;
    positioning the aligned starter tubes within the interior of a jacketing tube;
    establishing a pressure within the interior of the starter tubes;
    plasticizing the starter tubes to cause their tube walls to reform by moving toward and joining to one another and at least portions of the interior of the jacketing tube so as to form a core region along the axis with supporting webs between the core region and the jacketing tube; and
    drawing the reformed assembly into an optical fiber.

2. The method of claim 1 wherein said aligning step further comprises aligning four hollow elongated starter tubes about the axis in a rectangular 2×2 array so as to provide orthogonal webs upon said joining of said starter tubes to one another.

3. The method of claim 1 including fusing the aligned starter tubes along their respective lines of contact prior to said plasticiizing of said starter tubes.

4. The method of claim 1 wherein a pressure differential is applied to said starter tubes by applying a pressure within the exterior of said tubes and a vacuum exteriorly of portions thereof.

5. The method of claim 1 wherein the aligned starter tubes define an opening around the axis, and wherein the method further includes the step of placing the tube-defined opening under a vacuum.

6. A method for forming an optical fiber comprising the steps of:
    arraying a plurality of hollow starter tubes of optical fiber glass about an axis with each tube in contact with its adjacent tube to define an opening about the axis and positioning the arrayed tubes within a jacketing tube;
    establishing a pressure differential between the interiors of the starter tubes and the tube-defined opening and heating the starter tubes to cause the tube walls that define the opening to reform by moving toward and joining to one another so as to form a core region, along the axis resulting from the joining of wall portions of the starter tubes adjacent the openings, and supporting webs between the core region and the jacketing tube; and
    heating the reformed tube assembly to a temperature above its drawing temperature and drawing the reformed assembly into an optical fiber.

7. The method of claim 6 wherein said arraying step further comprises arraying four hollow starter tubes about the axis in a rectangular 2×2 array so as to provide orthogonal webs upon said joining of said starter tubes.

8. The method of claim 6 wherein the starter tubes have circular cross-sections.

9. The method of claim 6 wherein the inside diameter of the jacketing tube is selected so that a wall portion of each arrayed starter tube contacts the inside diameter of the jacketing tube.

10. The method of claim 6 wherein the pressure differential is established by pressurizing the interiors of the starter tubes and placing the tube-defined opening under a vacuum.

11. The method of claim 10 wherein a vacuum is also applied between the voids formed between the lines of contact of the starter tubes and the interior wall of the jacketing tube.

* * * * *